United States Patent
Glassey et al.

(10) Patent No.: US 9,840,632 B2
(45) Date of Patent: Dec. 12, 2017

(54) OXIDATIVELY DRYING INK COMPOSITIONS

(71) Applicant: SICPA HOLDING SA, Prilly (CH)

(72) Inventors: Anca Glassey, Pully (CH); Cécile Leprince, Yverdon-les-Bains (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/650,180

(22) PCT Filed: Nov. 12, 2013

(86) PCT No.: PCT/EP2013/073585
§ 371 (c)(1),
(2) Date: Jun. 5, 2015

(87) PCT Pub. No.: WO2014/086556
PCT Pub. Date: Jun. 12, 2014

(65) Prior Publication Data
US 2015/0307724 A1  Oct. 29, 2015

(30) Foreign Application Priority Data
Dec. 7, 2012 (EP) .................. 12196115

(51) Int. Cl.
| | | |
|---|---|---|
| B41M 3/14 | (2006.01) | |
| C09D 11/03 | (2014.01) | |
| B42D 25/378 | (2014.01) | |
| C09D 11/102 | (2014.01) | |
| C09D 11/12 | (2006.01) | |
| C09D 11/52 | (2014.01) | |
| B41M 1/28 | (2006.01) | |
| B41M 1/30 | (2006.01) | |
| B41M 1/34 | (2006.01) | |
| C08K 5/13 | (2006.01) | |
| C08K 5/3467 | (2006.01) | |
| C08K 5/357 | (2006.01) | |

(52) U.S. Cl.
CPC ............ *C09D 11/03* (2013.01); *B42D 25/378* (2014.10); *C09D 11/102* (2013.01); *C09D 11/12* (2013.01); *C09D 11/52* (2013.01); *B41M 1/28* (2013.01); *B41M 1/30* (2013.01); *B41M 1/34* (2013.01); *B41M 3/14* (2013.01); *B42D 2033/30* (2013.01); *C08K 5/13* (2013.01); *C08K 5/3467* (2013.01); *C08K 5/357* (2013.01)

(58) Field of Classification Search
None
See application file for complete search history.

(56) References Cited

U.S. PATENT DOCUMENTS

| | | |
|---|---|---|
| 2,418,479 A | 4/1947 | Carlton et al. |
| 2,570,856 A | 10/1951 | Carlton et al. |
| 3,676,273 A | 7/1972 | Graves |
| 3,791,864 A | 2/1974 | Steingroever |
| 4,705,300 A | 11/1987 | Phillips et al. |
| 4,705,356 A | 11/1987 | Phillips et al. |
| 4,721,217 A | 1/1988 | Phillips et al. |
| 4,838,648 A | 6/1989 | Phillips et al. |
| 4,938,801 A | 7/1990 | Yoshioka et al. |
| 5,074,914 A | 12/1991 | Shirota et al. |
| 5,084,351 A | 1/1992 | Phillips |
| 5,211,877 A | 5/1993 | Andrejewski et al. |
| 5,214,530 A | 5/1993 | Phillips et al. |
| 5,246,612 A | 9/1993 | Van Dijk et al. |
| 5,281,480 A | 1/1994 | Phillips et al. |
| 5,362,315 A | 11/1994 | Maurer et al. |
| 5,364,689 A | 11/1994 | Tamura et al. |
| 5,383,995 A | 1/1995 | Phillips et al. |
| 5,569,535 A | 10/1996 | Phillips et al. |
| 5,571,624 A | 11/1996 | Phillips et al. |
| 5,997,622 A | 12/1999 | Weber et al. |
| 6,001,161 A | 12/1999 | Weber et al. |
| 6,103,361 A | 8/2000 | Batzar et al. |
| 6,423,246 B1 | 7/2002 | Kasch |
| 6,838,166 B2 | 1/2005 | Phillips et al. |
| 2002/0160194 A1 | 10/2002 | Phillips et al. |
| 2004/0009309 A1 | 1/2004 | Chu et al. |
| 2004/0051297 A1 | 3/2004 | Chu et al. |
| 2008/0241492 A1 | 10/2008 | Muller et al. |

(Continued)

FOREIGN PATENT DOCUMENTS

| | | |
|---|---|---|
| DE | 2006848 | 9/1971 |
| EA | 201000232 | 8/2010 |

(Continued)

OTHER PUBLICATIONS

Chinese Office Action in counterpart Chinese Application No. 201380063498.X dated May 19, 2016.
Zweifel, "Plastics Additives Handbook", Hanser Publishers Munich, 5th Ed., ISB 3-446-21654-5 (2001).
Gaechter et al., "Taschenbuch der Kunststoff-Additive," ISBN 3-446-13689-4, 2 pages, (1983).
Buc et al., "Phenomenon of Bronze in Surface Coatings," Industrial and Eng. Chemistry, vol. 39, No. 2, pp. 147-154 (1947).
Steinert, "Effective Drying without Cobalt," European Coatings Journal, pp. 1- 6 (Mar. 2005).
Pfaff et al., "Angle-Dependent Optical Effects Deriving from Submicron Structures of Films and Pigments," Chem Review 99,pp. 163-1981 (1999).

(Continued)

Primary Examiner — Joshua D Zimmerman
(74) Attorney, Agent, or Firm — Greenblum & Bernstein, P.L.C.

(57) ABSTRACT

The present invention relates to the field oxidative drying inks suitable for offset, letterpress and intaglio printing. In particular, it relates to oxidative drying inks for printing by an offset process, letterpress process or intaglio process on a non-porous substrate selected from the group consisting of polymer materials, composite materials, metals or metalized materials and combinations thereof, said oxidative drying ink comprising at least one oxidative drying varnish and one or more neutral manganese complex compounds.

15 Claims, No Drawings

(56) References Cited

U.S. PATENT DOCUMENTS

| | | | |
|---|---|---|---|
| 2013/0102709 A1 | 4/2013 | Jansen et al. | |
| 2013/0274386 A1* | 10/2013 | Weijnen | C09D 167/08 524/92 |
| 2014/0342163 A1* | 11/2014 | Meijer | C08K 5/0091 428/423.1 |
| 2016/0304747 A1* | 10/2016 | Ang | C09F 9/00 |

FOREIGN PATENT DOCUMENTS

| | | |
|---|---|---|
| EP | 0096207 | 12/1983 |
| EP | 0285359 | 10/1988 |
| EP | 870811 | 10/1988 |
| EP | 0601483 | 6/1994 |
| EP | 686675 | 12/1995 |
| EP | 0710508 | 5/1996 |
| EP | 1046692 | 10/2000 |
| EP | 1213338 | 6/2002 |
| EP | 1382648 | 1/2004 |
| EP | 1564271 | 8/2005 |
| EP | 1790701 | 5/2007 |
| EP | 2014729 | 1/2009 |
| JP | 62-190272 | 8/1987 |
| JP | 63-218766 | 9/1988 |
| JP | H02-080470 | 3/1990 |
| JP | 06287600 | 10/1994 |
| RU | 2411271 | 2/2011 |
| WO | 02/073250 | 9/2002 |
| WO | 02/090002 | 11/2002 |
| WO | 02/100960 | 12/2002 |
| WO | 03/00801 | 1/2003 |
| WO | 2005/002866 | 1/2005 |
| WO | 2006128875 | 12/2006 |
| WO | 2007/131833 | 11/2007 |
| WO | 2008/003652 | 1/2008 |
| WO | 2008/083894 | 7/2008 |
| WO | 2009/007988 | 1/2009 |
| WO | 2009013169 | 1/2009 |
| WO | 2011/083309 | 7/2011 |
| WO | 2011/098583 | 8/2011 |
| WO | 2011/098584 | 8/2011 |
| WO | 2011/098587 | 8/2011 |
| WO | WO 2012079624 A1 * 6/2012 ........... C09D 167/08 |

OTHER PUBLICATIONS

Wieghardt et al., "Assembly and Structural Characterization of Binuclear u-Oxo-diu-acetato Bridged Complexes of Manganese(III). Analogues of the Di-iron(III) Centre in Hemerytrin," J. Chem. Soc., Chem. Commun., pp. 347-349 (1985).

Bouwman et al., "A Study of New Manganese Complexes as Potential Driers for Alkyd Paints," J. Coat. Technol. Res., 4 (4), pp. 491-503 (2007).

Prinzmeier, "Dem Brozieren auf der Spur," Farbe and Lack, 4 pages (Feb. 2012).

McCauley et al., "Preparation, Characterization, and Outer-Sphere Electron-Transfer Reactions of Nickel Complexes of 1,4,7-Triazacyclononane," Inorg. Chem., pp. 1938-1943 (1984).

Bassemir et al., "A Method for: the Identification and Assessment of the Presence of Bronzing in Printing Ink Films," American Ink Maker, pp. 99-104 (Oct. 2001).

Nuodex DryCoat—Cobalt-Free—Technical Data Sheet, Rockwood Pigments, 3 pages (Aug. 21, 2012).

Zarubica et al., "Colour Parameters, Whiteness Indices and Physical Features of Marking Paints for Horizontal Signalization," Physics, Chemistry and Technology, vol. 3, No. 2., pp. 205-216 (Feb. 3, 2005).

Richman et al., "Nitrogen Analogs of Crown Ethers," Journal of the American Chemical Society, 96:7, pp. 2268-2270 (1974).

Romakh et al., "Dinuclear Manganese Complexes Containing Chiral 1,4,7-Triazacyclononane-Derived Ligands and their Catalytic Potential for the Oxidation of Olefins, Alkanes, and Alcohols," Inorg. Chem., vol. 46, Co. 4, pp. 1315-1311 (2007).

Soucek et al., "Review of Oxidation and Driers," Progress in Organic Coatings, vol. 73, pp. 435-454 (Oct. 6, 2011).

Wieghardt et al., "Synthesis, Crystal Structures, Reactivity, and Magnetochemistry of a Series of Binuclear Complexes of Manganese(II), -(III), and -(IV) of Bioological Relevance . . . ," J. Am. Chem. Soc., pp. 7398-7349 (1985).

Zhang et al., "Synthesis and Characterization of the Cobalt(III) Complexes with Tetraaza Macrocyclic Ligands Having Strategically Appended Functional Groups," Inorg. Chem. pp. 4920-4924 (1993).

Russia office action in counterpart Russian Application No. 2015127017 dated Nov. 15, 2016 (and English language translation).

Taiwanese office action in counterpart Taiwanese Application No. 102144023 dated Jan. 23, 2017 (and English language translation).

Chinese office action in counterpart Chinese Application No. 201380063498.X dated Jan. 23, 2017 (with English translation).

Journal of Molecular Catalysis A: Chemical, vol. 185, No. 1-2, pp. 71-80 (2002).

Japanese office action in counterpart Japanese Application No. P2015-545721 dated Apr. 18, 2017 (and English language translation).

Ukrainian Office Action in counterpart Ukrainian Application No. A 2015 06432 dated Jan. 17, 2017 (and English language translation).

\* cited by examiner

OXIDATIVELY DRYING INK COMPOSITIONS

The present invention relates to the field of inks or compositions suitable for printing of security documents. In particular the present invention relates to the field of oxidative drying inks suitable for offset, letterpress and intaglio printing.

BACKGROUND OF THE INVENTION

Oxidative drying inks or compositions (hereafter referred as "oxidative drying inks") refer to inks which dry by oxidation in the presence of oxygen, in particular in the presence of the oxygen of the atmosphere. During the drying process, the oxygen combines with one or more components of the ink vehicle, converting the ink to a semi-solid or a solid state. The process may be accelerated by the use of catalysts such as metallic salts and/or by the application of a thermal treatment. During conventional printing of oxidative drying inks, the drying process proceeds during a few hours to a few days.

Preferably oxidative drying inks comprise catalysts or driers (also referred in the art as siccatives, siccative agents, desiccatives or dessicators) to set up the oxidation process. Examples of driers include inorganic or organic salts of metal(s), metallic soaps of organic acids, metal complexes and metal complex salts. Known driers comprise metals such e.g. cobalt, copper, manganese, cerium, zirconium, barium, strontium, lithium, bismuth, calcium, vanadium, zinc, iron and mixtures thereof. Typical examples of suitable salts include without limitation anions such as e.g. halides, nitrates, sulfates and carboxylates.

In particular, cobalt salts are widely used as driers for inks and coatings due to their high oxidative efficiency and their robustness, i.e. their efficiency remains high independently of the coating compositions.

Catalysts comprising other metals, such as e.g. manganese, cerium, zirconium, bismuth, calcium, zinc and iron, have been used as catalysts for the drying process of oxidative drying inks. However, their oxidative drying efficiency tends to be weaker as compared to cobalt catalysts. Moreover, these catalysts' robustness is more restricted as compared to the conventional cobalt catalysts.

There is some increasing concern about cobalt containing driers for reasons of health and environment issues. Cobalt compounds are under increasing scrutiny and, due to their suspected reprotoxic activity and to new regulations such as REACH, they are increasingly re-classified in more toxic categories. For instance, the environmental toxicity of the widely used drier cobalt octoate is now indicated as very toxic to aquatic organisms; previously it was classified as N, R51/53; the new assessment of this product toxicity requires a classification as R52/R53 for products between 0.25 and 2.5 wt-% of this cobalt compound.

Furthermore cobalt containing driers, when admixed to coatings or inks are known to have a negative tendency to produce discoloration and/or yellowing of said coatings and inks.

In an attempt to provide new environmental more friendly driers, a variety of compounds have been developed.

Manganese containing compounds have been developed as driers for coatings or inks. E. Bouwman and R. van Gorkum disclose complexes of manganese, pentadione and bipyridyl as driers for alkyd paints, in particular for the oxidative crosslinking of ethyl linoleate (J. Coat Technol Res 4(4) (2007, 491-503). WO 2008/003652 A1 and WO 2011/083309 A1 disclose catalysts based on iron-manganese complexes containing polydentate ligands for air-drying alkyd-based resins. EP 1 564 271B1 discloses driers consisting of a combination of iron and manganese salts of fatty acids. WO 2011/098583 A1, WO 2011/098584 A1 and WO 2011/098587 A1 disclose oxidative drying coating compositions comprising polymers containing unsaturated fatty acid residues and manganese salts complexes as drying catalysts.

The main disadvantage of known manganese salts is their tendency to cause coating yellowing (European Coating Journal 03 (2005), 84).

Vanadium containing driers have been developed as driers for coatings or inks. EP 870 811 A2 discloses vanadium complexes as driers for oxidative drying lacquers. EP 2 014 729 A1 discloses intaglio printing inks comprising a vanadium salt as drier.

EP 1 382 648 A1 discloses complexes of metal such as vanadium, manganese, iron, nickel, copper and cerium, suitable as driers that have furthermore anti-skinning properties.

Recent developments in the field of driers for oxidizing alkyds useful as polymeric binders have been reviewed by Soucek and Wu in Progress in Organic Coatings (2012) 73, 435-454. However, none of these driers is as reactive and universal as the cobalt containing driers known in the art. Alternative driers also frequently tend to produce undesired yellowing and bronzing of the dried coating. Moreover, alternative driers often cause storage stability problem related to skin formation inside the ink container and require the addition of increased concentrations of anti-skinning agents.

Therefore, a need remains for oxidative drying inks comprising environmentally friendly driers exhibiting efficient and robust drying while maintaining good non-yellowing characteristics upon use and time.

SUMMARY

It has been surprisingly found that oxidatively drying inks comprising at least one oxidative drying varnish and one or more neutral manganese complex compounds having the formula (I)

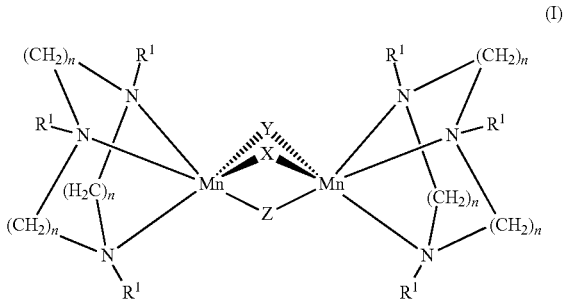

wherein
$R_1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
n is an integer in a range between 1 and 5;
X, Y and Z are identical or different from each other $R_2COO^-$;
$R_2$ are identical or different from each other and selected from the group consisting of H, $C_1$-$C_{18}$-alkyls, $C_1$-$C_{18}$- alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls, as oxidative catalysts or driers, suitable for printing by an offset process, letterpress process or intaglio process on non-porous substrates selected from the group consisting of polymer materials, composite materials, metals or metalized materials and combinations thereof, combine a short drying time while exhibiting good non-yellowing characteristics upon use and time and while being environmentally friendly.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" means that the amount or value in question may be the value designated or some other value about the same. The phrases are intended to convey that similar values within a range of ±5% of the indicated value promote equivalent results or effects according to the invention.

The terms "composition" refers to any composition which is capable of forming a coating on a solid substrate and which can be applied preferentially but not exclusively by a printing method. As used herein, the term "intaglio ink composition" refers to an ink composition which is applied by an intaglio printing process, also designated as engraved copper plate steel die printing process.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "neutral manganese complex compound" refers to a compound comprising one or more manganese cations, one or more mono- or poly-dentate ligands and one or more anionic ligands. The cations and the ligands are selected such that the overall electronic charge of the complex is zero.

The term "yellowing" refers to the tendency of some inks or coatings to become yellowish, hence to vary their color, upon drying, curing and/or ageing. The yellowing or non-yellowing behavior is characterized by the variation of the color upon drying, curing and/or ageing given by one or more parameters of the CIE(1976) system, i.e. L*, a* and/or b*, wherein L* is the vertical coordinate of a three-dimensional system of colors and has values from 0 (black) to 100 (for white); a* is the horizontal coordinate the values of which range from −80 (green) to +80 (red) and b* is the horizontal coordinate the values of which range from −80 (blue) to +80 (yellow). More details concerning CIE(1976) system can be found in Physics, Chemistry and Technology Vol. 3, No 2, 2005, pp. 205-216. In particular, the yellowing or non-yellowing behavior of an ink or coating may be characterized by the variation of b* upon time either under normal conditions (e.g. laboratory conditions) or under thermal ageing (e.g. in an oven at 60° C.). Yellowing may be in particular noticeable with white and transparent ink layers. Yellowing may be caused by products such as for example oxidation or decomposition products formed during the drying or the curing of the ink or the coating, and/or by products formed by decomposition of ink or coating composition components in the course of ageing.

The term "bronzing", also sometimes called "differential gloss", refers to an issue observed with some specific combinations of ink and substrate wherein a printed surface comprise some darkened regions exhibiting a bronze-like appearance.

The one or more one or more neutral manganese complex compounds suitable as oxypolymerization catalysts described herein are compounds of general structure (I) or mixtures of different compounds of general structure (I):

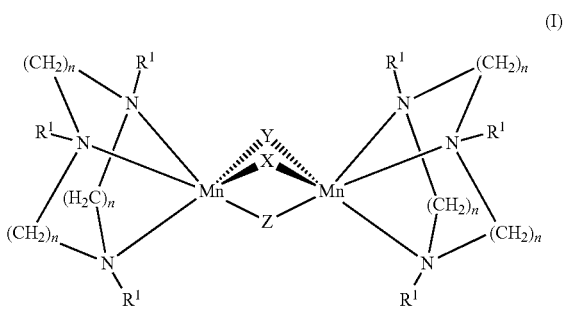

wherein $R_1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;

n is an integer in a range between 1 and 5, preferably between 2 and 5;

X, Y and Z are identical or different from each other $R_2COO^-$;

$R_2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls, More preferably, the one or more one or more neutral manganese compounds suitable as oxypolymerization catalysts or driers are compounds of structure (I) or mixtures of different compounds of structure (I), wherein $R_1$ are identical or different from each other and selected from the group consisting of $C_1$-$C_{18}$-alkyls;

n is an integer in a range between 1 and 5, preferably between 2 and 5;

X, Y and Z are identical or different from each other $R_2COO^-$;

$R_2$ is selected from the group consisting of $C_1$-$C_{18}$-alkyls.

Still more preferably, the one or more one or more neutral manganese compounds suitable as oxypolymerization catalysts or driers described herein are compounds or mixtures of compounds of structure (II)

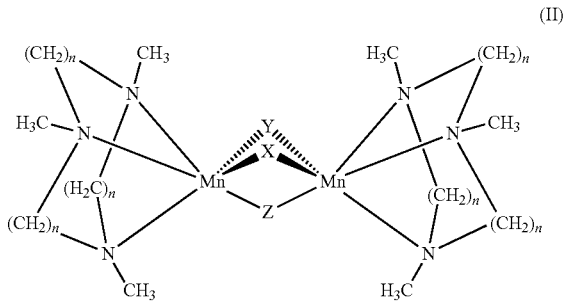

(II)

wherein

X, Y and Z are identical or different from each other and selected from the group consisting of $CH_3$—$COO^-$ or $CH_3$—$(CH_2)_3$—$CH(CH_3CH_2)COO^-$, and n is an integer in a range between 1 and 4, preferably between 2 and 4, and more preferably between 2 and 3.

Compounds of structure (II) suitable as oxypolymerization catalysts described herein are commercially available as Nuodex DryCoat from Rockwood Pigments, UK (CAS Number [1381939-25-8]], Reach Registration Number 01-2119919049-35-0000).

The manganese complexes suitable for the present invention can be prepared by adding together the poly-dentate ligand with a corresponding Mn carboxylate. The preparations of those complexes is known in the art (e.g. Romakh et al., Inorg. Chem 2007, 1315-1331, in particular citations 1-5).

The polydentate ligand can be prepared by methods known in the art (e.g. Richman et al., J. Am. Chem. Soc. 1974, 96, 2268-2270; McAuley et al., Inorg. Chem. 1984, 23-1938-1943; Zhang et al., Inorg. Chem. 1993, 32, 4920, 4924; Romakh et al., Inorg. Chem 2007, 1315-1331). Generally, a suitable aliphatic triamine is fully tosylated and reacted with a base (such as $NaOC_2H_5$) to yield the disodium salt of the tosylate triamine. The disodium salt is subsequently reacted with a respective alkylene ditosylate, resulting in the desired cyclic triamine after detosylation. Radicals R1 in the above formula (I) can be attached by methods known in the art (e.g. Romakh et al., Inorg. Chem 2007, 1315-1331, e.g. scheme 3 on p. 1317) by standard nucleophilic substitution at the N atoms.

It has been found that layers or coatings made of the oxidatively drying inks comprising the one or more neutral manganese complex compounds of structure (I) or (II) or mixtures of various neutral manganese complex compounds of structure (I) or (II) described herein may be dried after application on a non-porous substrate selected from the group consisting of polymer materials, composite materials, metals or metalized materials and combinations thereof by a printing process selected from the group consisting of offset processes, letterpress processes and intaglio printing processes, with a shorter drying time as compared to the various driers known in the art.

The one or more neutral manganese complex compounds described herein are preferably present in the oxidative drying ink described herein in an amount from about 0.01 to about 10 wt-%, preferably from about 0.1 to about 5 wt-%, the weight percents being based on the total weight of the oxidative drying ink. The one or more neutral manganese complex compounds described herein are preferably present in the oxidative drying ink described herein in an amount such that the metal atom or metal ion concentration in weight % is comprised in a range from about 0.0001 to about 10 wt-%, more preferably from about 0.001 to about 5 wt-%, still more preferably from about 0.01 to about 1 wt-%, the weight percents being based on the total weight of the oxidative drying ink.

The oxidatively drying inks described herein comprise at least one oxidative drying varnish. The term "varnish" is also referred in the art as resin, binder or ink vehicle. The at least one oxidative drying varnish is preferably present in the oxidatively drying inks described herein in an amount from about 10 to about 90 wt-%, the weight percents being based on the total weight of the oxidatively drying ink.

Suitable oxidative drying varnishes for the oxidatively drying inks described herein are drying oils, i.e. vanishes that cure under the action of oxygen, for instance oxygen from the air ("air-drying").

Alternatively, and with the aim of accelerating the drying process, the drying process may be performed under hot air, infrared or any combination of hot air and infrared.

Oxidative drying varnishes are typically polymers comprising unsaturated fatty acid residues, saturated fatty acids residues or mixtures thereof, as generally known in the art. Preferably the oxidative drying varnishes described herein comprise unsaturated fatty acid residues to ensure the air drying properties. Particularly preferred oxidative drying varnishes are resins comprising unsaturated acid groups, even more preferred are resins comprising unsaturated carboxylic acid groups. However the resins may also comprise saturated fatty acids residues. Preferably the oxidative drying varnishes described herein comprise acid groups, i.e. the oxidative drying varnishes are selected among acid modified resins. The oxidative drying varnishes described herein may be selected from the group consisting of alkyd resins, vinyl polymers, polyurethane resins, hyperbranched resins, rosin-modified maleic resins, rosin-modified phenol resins, rosin ester, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified alkyd resin, terpene resins nitrocellulose resins, polyolefins, polyamides, acrylic resins and combinations or mixtures thereof. Polymers and resins are herein interchangeably used.

Saturated and unsaturated fatty acid compounds may be obtained from natural and/or artificial sources. Natural sources include animal sources and/or plant sources. Animal sources may comprise animal fat, butter fat, fish oil, lard, liver fats, tuna fish oil, sperm whale oil and/or tallow oil and waxes. Plant sources may comprise waxes and/or oils such as vegetable oils and/or non-vegetable oils. Examples of plant oils include without limitation bitter gourd, borage, calendula, canola, castor, china wood, coconut, conifer seed, corn, cottonseed, dehydrated castor, flaxseed, grape seed, *Jacaranda mimosifolia* seed, linseed oil, palm, palm kernel, peanut, pomegranate seed, rapeseed, safflower, snake gourd, soya (bean), sunflower, tall, tung and wheat germ. Artificial sources include synthetic waxes (such as micro crystalline and/or paraffin wax), distilling tail oil and/or chemical or biochemical synthesis methods. Suitable fatty acids also include (Z)-hexadan-9-enoic[palmitoleic]acid ($C_{16}H_{30}O_2$), (Z)-octadecan-9-enoic[oleic]acid ($C_{18}H_{34}O_2$), (9Z,11E,13E)-octadeca-9,11,13-trienoic[α-eleostearic]acid ($C_{18}H_{30}O_2$), licanic acid, (9Z,12Z)-octadeca-9,12-dienoic [linoeic]acid ($C_{18}H_{32}O_2$), (5Z,8Z,11Z,14Z)-eicosa-5,8,11,14-tetraenoic[arachidonic]acid ($C_{20}H_{32}O_2$), 12-hydroxy-(9Z)-octadeca-9-enoic[ricinoleic]acid ($C_{18}H_{34}O_3$), (Z)-docosan-13-enoic[erucic]acid (C$_{22}$H$_{42}$O$_3$), (Z)-eicosan-9-enoic[gadoleic]acid (C$_{20}$H$_{38}$O$_2$), (7Z,10Z,13Z,16Z,19Z)-docosa-7,10,13,16,19-pentaenoic[clupanodonic] acid and mixtures thereof.

Suitable fatty acids are ethylenically unsaturated conjugated or non-conjugated C2-C24 carboxylic acids, such as myristoleic, palmitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils.

The oxidatively drying inks described herein may further comprise one or more co-catalysts. Suitable co-catalysts include without limitation polyvalent salts containing cobalt, calcium, copper, zinc, iron, zirconium, manganese, barium, zinc, strontium, lithium, vanadium and potassium as the cation(s); and halides, nitrates, sulphates, carboxylates like acetates, ethylhexanoates, octanoates and naphtenates or acetoacetonates as the anion(s). Preferably, the one or more co-catalysts are selected from the group consisting of ethylhexanoates of calcium, strontium, zirconium, zinc and mixtures thereof. When present, the one or more co-catalysts are preferably present in an amount from about 0.1 to about 1.0 wt-%, the weight percents being based on the total weight of the oxidatively drying ink. Alternatively, suitable co-catalysts include without limitation basic compounds such as amines. Typical examples of basic compounds include without limitation primary amines (e.g. diethylenetriamine), tertiary amines (e.g 1,1,4,7,10,10-hexamethyltriethylenetetramine) or mixtures thereof. When present, the one or more basic compounds are preferably present in an amount from about 0.03 to about 1.0 wt-%, the weight percents being based on the total weight of the oxidatively drying ink. Examples of co-catalysts may be found e.g. in WO 2011/098583 or in WO 2009/007988 and the thereto related documents.

The oxidatively drying inks described herein may further comprise one or more antioxidants such as those known by people skilled in the art. Suitable antioxidants include without limitation alkyl phenols, hindered alkyl phenols, alkylthiomethyl-phenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are commercially available for example from the sources disclosed in WO 02/100 960. Additional general information about antioxidants can be found in Taschenbuch der Kunststoff-Additive (R. Gächter and H. Müller, Carl Hanser Verlag München Wien, 2. Ausg. 1983, ISBN 3-446-13689-4) or Plastics Additives Handbook (H. Zweifel, 5th Ed. 2001, Hanser Publishers Munich, ISB 3-446-21654-5). Hindered alkyl phenols are phenols having at least one or two alkyl groups ortho to the phenolic hydroxyl. One, preferably both, alkyl groups ortho to the phenolic hydroxyl are preferably secondary or tertiary alkyl, most preferred tertiary alkyl, especially tert-butyl, tert-amyl or 1,1,3,3-tetramethylbutyl. Preferred antioxidants are hindered alkyl phenols and especially, 2-tert-butyl-hydroquinone, 2,5-di-tert-butyl-hydroquinone, 2-tert-butyl-p-cresol and 2,6-di-tert-butyl-p-cresol. When present, the one or more antioxidants are present in an amount from about 0.05 to about 3 wt-%, the weight percents being based on the total weight of the oxidatively drying ink.

The oxidatively drying inks described herein are oxidative drying inks suitable for offset, letterpress and intaglio printing. Typically, oxidative drying inks suitable for offset printing processes have a viscosity in the range of about 3 to about 12 Pa s at 40° C. and 1000 s$^{-1}$; oxidative drying inks suitable for letterpress printing processes have a viscosity in the range of about 6 to about 16 Pa s at 40° C. and 1000 s$^{-1}$; and oxidative drying inks suitable for intaglio printing processes have a viscosity in the range of about 3 to about 60 Pa s at 40° C. and 1000 s$^{-1}$, the viscosities being measured on a Haake Roto-Visco RV1 with a cone plate 1.

The oxidative drying inks suitable for offset printing described herein are color constant composition inks. The oxidative drying inks suitable for letterpress printing and for intaglio printing described herein may be color constant inks or optically variable inks.

According to one aspect of the present invention, the oxidatively drying inks described herein are color constant composition inks preferably comprising a) one or more dyes, and/o b) inorganic pigments, organic pigments or mixtures thereof. Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of suitable dyes include without limitation coumarines, cyanines, oxazines, uranines, phtalocyanines, indolinocyanines, triphenylmethanes, naphtalocyanines, indononaphtalo-metal dyes, anthraquinones, anthrapyridones, azo dyes, rhodamines, squarilium dyes, croconium dyes. Typical examples of dyes suitable for the present invention include without limitation C.I. Acid Yellow 1, 3, 5, 7, 11, 17, 19, 23, 25, 29, 36, 38, 40, 42, 44, 49, 54, 59, 61, 70, 72, 73, 75, 76, 78, 79, 98, 99, 110, 111, 121, 127, 131, 135, 142, 157, 162, 164, 165, 194, 204, 236, 245; C.I. Direct Yellow 1, 8, 11, 12, 24, 26, 27, 33, 39, 44, 50, 58, 85, 86, 87, 88, 89, 98, 106, 107, 110, 132, 142, 144; C.I. Basic Yellow 13, 28, 65; C.I. Reactive Yellow 1, 2, 3, 4, 6, 7, 11, 12, 13, 14, 15, 16, 17, 18, 22, 23, 24, 25, 26, 27, 37, 42; C.I. Food Yellow 3, 4; C.I. Acid Orange 1, 3, 7, 10, 20, 76, 142, 144; C.I. Basic Orange 1, 2, 59; C.I. Food Orange 2; C.I. Orange B; C.I. Acid Red 1, 4, 6, 8, 9, 13, 14, 18, 26, 27, 32, 35, 37, 42, 51, 52, 57, 73, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 221, 249, 252, 254, 262, 265, 274, 282, 289, 303, 317, 320, 321, 322, 357, 359; C.I. Basic Red 1, 2, 14, 28; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, 253; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 108, 180; C.I. Food Red 1, 7, 9, 14; C.I. Acid Blue 1, 7, 9, 15, 20, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 193, 199, 203, 204, 205, 229, 234, 236, 249, 254, 285; C.I. Basic Blue 1, 3, 5, 7, 8, 9, 11, 55, 81; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, 77; C.I. Food Blue 1, 2; C.I. Acid Green 1, 3, 5, 16, 26, 104; C.I. Basic Green 1, 4; 0.1: Food Green 3; C.I. Acid Violet 9, 17, 90, 102, 121; C.I. Basic Violet 2, 3, 10, 11, 21; C.I. Acid Brown 101, 103, 165, 266, 268, 355, 357, 365, 384; C.I. Basic Brown 1; C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, 194; C.I. Direct Black 17, 19, 22, 32, 39, 51, 56, 62, 71, 74, 77, 94, 105, 106, 107, 108, 112, 113, 117, 118, 132, 133, 146, 154, 168; C.I. Reactive Black 1, 3, 4, 5, 6, 8, 9, 10, 12, 13, 14, 18, 31; C.I. Food Black 2; C.I. Solvent Yellow 19, C.I. Solvent Orange 45, C.I. Solvent Red 8, C.I. Solvent Green 7, C.I. Solvent Blue 7, C.I. Solvent Black 7; C.I. Disperse Yellow 3, C.I. Disperse Red 4, 60, C.I. Disperse Blue 3, and metal azo dyes dislcosed in U.S. Pat. Nos. 5,074,914, 5,997,622, 6,001,161, JP 02-080470, JP 62-190272, JP 63-218766. Suitable dyes for the present invention may be infrared absorbing dyes, luminescent dyes. When present, the one or more dyes used in the oxidative drying ink described herein are preferably present in an amount from about 1 to about 20 wt-%, the weight percents being based on the total weight of the oxidatively drying ink.

Typical examples of organic and inorganic pigments include without limitation C.I. Pigment Yellow 12, C.I. Pigment Yellow 42, C.I. Pigment Yellow 93, 109, C.I. Pigment Yellow 110, C.I. Pigment Yellow 147, C.I. Pigment Yellow 173, C.I. Pigment Orange 34, C.I. Pigment Orange 48, C.I. Pigment Orange 49, C.I. Pigment Orange 61, C.I. Pigment Orange 71 C.I. Pigment Orange 73, C.I. Pigment Red 9, C.I. Pigment Red 22, C.I. Pigment Red 23, C.I. Pigment Red 67, C.I. Pigment Red 122, C.I. Pigment Red 144, C.I. Pigment Red 146, C.I. Pigment Red 170, C.I. Pigment Red 177, C.I. Pigment Red 179, C.I. Pigment Red 185, C.I. Pigment Red 202, C.I. Pigment Red 224, C.I. Pigment Red 242, C.I. Pigment Red 254, C.I. Pigment Red 264, C.I. Pigment Brown 23, C.I. Pigment Blue 15, C.I. Pigment Blue 15:3, C.I. Pigment Blue 60, C.I. Pigment Violet 19, C.I. Pigment Violet 23, C.I. Pigment Violet 32, C.I. Pigment Violet 37, C.I. Pigment Green 7, C.I. Pigment Green 36, C.I. Pigment Black 7, C.I. Pigment Black 11, metal oxides such as titanium dioxide, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black, mixed metal oxides, azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments. When present, the inorganic pigments, organic pigments or mixtures thereof described herein are preferably present in an amount from about 0.1 to about 45 wt-%, the weight percents being based on the total weight of the oxidatively drying ink.

When the oxidatively drying ink described herein is an optically variable ink, it comprises optically variable pigments or a mixture of different optically variable pigments. Optically variable inks may further comprise one or more color constant pigments. Optically variable inks preferably comprise optically variable pigments or a mixture of different optically variable pigments, wherein the optically variable pigments are preferably selected from the group consisting of thin film interference pigments, magnetic thin film interference pigments, interference coated pigments, cholesteric liquid crystal pigments and mixtures thereof. When present, the optically variable pigments are preferably comprised in the oxidatively drying ink described herein in an amount between about 5 and about 40 wt-% and more preferably in an amount between about 10 and about 35 wt-%, the weight percents being based on the total weight of the oxidatively drying ink.

Suitable thin film interference pigments exhibiting optically variable characteristics are known to those skilled in the art and disclosed in U.S. Pat. Nos. 4,705,300; 4,705,356; 4,721,217; 5,084,351; 5,214,530; 5,281,480; 5,383,995; 5,569,535, 5,571,624 and in the thereto related documents. When at least a part of the optically variable pigments consists of thin film interference pigments, it is preferred that the thin film interference pigments comprise a Fabry-Perot reflector/dielectric/absorber multilayer structure and more preferably a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum (Al), chromium (Cr), nickel (Ni), and mixtures thereof and still more preferably aluminum (Al). Preferably, the dielectric layers are independently selected from the group consisting of magnesium fluoride ($MgF_2$), silicon dioxide ($SiO_2$) and mixtures thereof and more preferably magnesium fluoride ($MgF_2$). Preferably, the absorber layers are independently selected from the group consisting of chromium (Cr), nickel (Ni), metallic alloys and mixtures thereof and more preferably chromium (Cr). When at least a part of the optically variable pigments consists of thin film interference pigments, it is particularly preferred that the thin film interference pigments comprise a Fabry-Perot absorber/dielectric/reflector/dielectric/absorber multilayer structure consisting of a $Cr/MgF_2/Al/MgF_2/Cr$ multilayer structure.

Suitable magnetic thin film interference pigments exhibiting optically variable characteristics are known to those skilled in the art and disclosed in U.S. Pat. No. 4,838,648; WO 02/073250; EP-A 686 675; WO 03/00801; U.S. Pat. No. 6,838,166; WO 2007/131833 and in the thereto related documents. Due to their magnetic characteristics being machine readable, compositions comprising magnetic thin film interference pigments may be detected for example with the use of specific magnetic detectors. Therefore, compositions comprising magnetic thin film interference pigments may be used as an authentication tool for security threads or stripes. When at least a part of the optically variable pigments consists of magnetic thin film interference pigments, it is preferred that the magnetic thin film interference pigments comprise a 5-layer Fabry-Perot absorber/dielectric/reflector/dielectric/absorber multilayer structure wherein the reflector and/or the absorber is also a magnetic layer such as disclosed in U.S. Pat. No. 4,838,648 and/or 7-layer a Fabry-Perot absorber/dielectric/reflector/magnetic/reflector/dielectric/absorber multilayer structure such as disclosed in WO 02/073250; and more preferably a 7-layer Fabry-Perot absorber/dielectric/reflector/magnetic/reflector/dielectric/absorber multilayer structure. Preferably, the reflector layers described herein are selected from the group consisting of metals, metal alloys and combinations thereof, preferably selected from the group consisting of reflective metals, reflective metal alloys and combinations thereof and more preferably from the group consisting of aluminum (Al), chromium (Cr), nickel (Ni), and mixtures thereof and still more preferably aluminum (Al). Preferably, the dielectric layers are independently selected from the group consisting of magnesium fluoride ($MgF_2$), silicium dioxide ($SiO_2$) and mixtures thereof and more preferably magnesium fluoride ($MgF_2$). Preferably, the absorber layers are independently selected from the group consisting of chromium (Cr), nickel (Ni), metallic alloys and mixtures thereof and more preferably chromium (Cr). Preferably, the magnetic layer is selected from the group consisting of nickel (Ni), iron (Fe) and cobalt (Co) and mixtures thereof. When at least a part of the optically variable pigments consists of magnetic thin film interference pigments, it is particularly preferred that the magnetic thin film interference pigments comprise a 7-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

Thin film interference pigments and magnetic thin film interference pigments described herein are typically manufactured by vacuum deposition of the different required layers onto a web. After deposition of the desired number of layers, the stack of layers is removed from the web, either by dissolving a release layer in a suitable solvent, or by stripping the material from the web. The so-obtained material is then broken down to flakes which have to be further processed by grinding, milling or any suitable method. The resulting product consists of flat flakes with broken edges, irregular shapes and different aspect ratios.

Other magnetic color shifting pigments can be used as well, such as asymmetric magnetic thin film interference pigments, magnetic liquid crystal pigments or interference coated pigments including a magnetic material.

The magnetic interference pigments described herein, when incorporated into the optically variable composition may be further oriented after application and before drying or curing, through the application of an appropriate magnetic field and consecutively fixed in their respective positions and orientations by hardening the applied composition. Materials and technology for the orientation of magnetic particles in a coating composition, and corresponding combined printing/magnetic orienting processes have been disclosed in U.S. Pat. Nos. 2,418,479; 2,570,856; 3,791,864; DE-A 2006848; U.S. Pat. Nos. 3,676,273; 5,364,689; 6,103,361; US 2004/0051297; US 2004/0009309; EP-A 0 710 508, WO 02/090002; WO 03/000801; WO 2005/002866, and US 2002/0160194.

Suitable interference coated pigments include without limitation structures consisting of a substrate selected from the group consisting of metallic cores such as titanium, silver, aluminum, copper, chromium, iron, germanium, molybdenum, tantalum or nickel coated with one or more layers made of metal oxides as well as structure consisting of a core made of synthetic or natural micas, another layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures thereof coated with one or more layers made of metal oxides (e.g. titanium oxides, zirconium oxides, tin oxides, chromium oxides, nickel oxides, copper oxides and iron oxides), the structures described hereabove have been described for example in Chem. Rev. 99 (1999), G. Pfaff and P. Reynders, pages 1963-1981 and WO 2008/083894. Typical examples of these interference coated pigments include without limitation silicium oxide cores coated with one or more layers made of titanium oxide, tin oxide and/or iron oxide; natural or synthetic mica cores coated with one or more layers made of titanium oxide, silicium oxide and/or iron oxide, in particular mica cores coated with alternate layers made of silicium oxide and titanium oxide; borosilicate cores coated with one or more layers made of titanium oxide, silicium oxide and/or tin oxide; and titanium oxide cores coated with one or more layers made of iron oxide, iron oxide-hydroxide, chromium oxide, copper oxide, cerium oxide, aluminum oxide, silicium oxide, bismuth vanadate, nickel titanate, cobalt titanate and/or antimony-doped, fluorine-doped or indium-doped tin oxide; aluminum oxide cores coated with one or more layers made of titanium oxide and/or iron oxide.

Liquid crystals in the cholesteric phase exhibit a molecular order in the form of a helical superstructure perpendicular to the longitudinal axes of its molecules. The helical superstructure is at the origin of a periodic refractive index modulation throughout the liquid crystal material, which in turn results in a selective transmission/reflection of determined wavelengths of light (interference filter effect). Cholesteric liquid crystal polymers can be obtained by subjecting one or more crosslinkable substances (nematic compounds) with a chiral phase to alignment and orientation. The particular situation of the helical molecular arrangement leads to cholesteric liquid crystal materials exhibiting the property of reflecting a circularly polarized light component within a determined wavelength range. The pitch can be tuned in particular by varying selectable factors including the temperature and solvents concentration, by changing the nature of the chiral component(s) and the ratio of nematic and chiral compounds. Crosslinking under the influence of UV radiation freezes the pitch in a predetermined state by fixing the desired helical form so that the color of the resulting cholesteric liquid crystal materials is no longer depending on external factors such as the temperature. Cholesteric liquid crystal materials may then be shaped to cholesteric liquid crystal pigments by subsequently comminuting the polymer to the desired particle size. Examples of films and pigments made from cholesteric liquid crystal materials and their preparation are disclosed in U.S. Pat. Nos. 5,211,877; 5,362,315 and 6,423,246 and in EP-A 1 213 338; EP-A 1 046 692 and EP-A 0 601 483, the respective disclosure of which is incorporated by reference herein.

In one embodiment, the one or more neutral manganese complex compounds comprised in the oxidative drying ink comprising inorganic pigments, organic pigments or mixtures thereof described herein are particularly suitable for providing inks suitable for offset printing processes and/or letterpress printing processes and exhibiting reduced or no bronzing behavior when the ink is applied to a non-porous substrate. The problem of bronzing arises in color pigmented ink compositions, i.e. oxidatively drying inks comprising inorganic pigments, organic pigments or mixtures thereof described herein preferably in an amount from about 0.1 to about 45 wt-%, the weight percents being based on the total weight of the oxidatively drying ink, in particular, but not only, in blue-violet and red-orange pigmented ink compositions. The cause of bronzing is still subject to debate. The most commonly accepted hypothesis explains the bronzing effect by the poor wetting of pigment particles which therefore protrude on the surface of the coating layer, thus producing inhomogeneous reflectivity of the layer surface. Reference is made to Matthias Prinzmeier in Farbe and Lack (2012), pages 24-27, NPIRI study in American Ink Maker (2001) 99-104, and G.L. Buc et al in Industrial and Engineering Chemistry 39 (1947) 147-154. The oxidatively drying ink compositions described herein are suitable to produce printed features having an improved bronzing behavior, i.e. a reduced bronzing effect, or printed features free of any bronzing defects. In the present invention, the bronzing effect has been assessed by calculating the difference of hue, Δh, at two pairs of illumination/observation angles, as proposed in the references cited above.

The oxidatively drying inks described herein may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminium silicate), sulfates (e.g. magnesium sulfate, barium sulphate), titanates (e.g. potassium titanate), alumina hydrates, silica, fumed silica, montmorillonites, graphites, anatases, rutiles, bentonites, vermiculites, zinc whites, zinc sulphides, wood flours, quartz flours, natural fibers, synthetic fibres and combinations thereof. When present, the one or more fillers or extenders are preferably present in an amount from about 0.1 to about 40 wt-%, the weight percents being based on the total weight of the oxidatively drying ink.

The oxidatively drying inks described herein may further comprise one or more waxes preferably selected from the group consisting of synthetic waxes, petroleum waxes and natural waxes. Preferably the one or more waxes are selected from the group consisting of microcrystalline waxes, paraffin waxes, polyethylene waxes, fluorocarbon waxes, polytetrafluoroethylene waxes, Fischer-Tropsch waxes, silicone fluids, beeswaxes, candelilla waxes, montan waxes, carnauba waxes and mixtures thereof. When present, the one or more waxes are preferably present in an amount from about 0.1 to about 15 wt-%, the weight percents being based on the total weight of the oxidatively drying ink.

The oxidatively drying inks described herein may further comprise one or more machine readable materials selected from the group consisting of magnetic materials, luminescent materials, electrically conductive materials, infrared-absorbing materials and combinations or mixtures thereof. As used herein, the term "machine readable material" refers to a material which exhibits at least one distinctive property which is detectable by a device or α-machine, and which can be comprised in a layer so as to confer a way to authenticate said layer or article comprising said layer by the use of particular equipment for its authentication. Magnetic materials are preferably present in an amount from about 5 to about 70 wt-%, luminescent compounds are preferably present in an amount from about 0.5 to about 60 wt-% and infrared-absorbing compounds are preferably present in an amount from about 0.3 to about 60 wt-%, the weight percents being based on the total weight of the oxidatively drying ink.

As known by those skilled in the art, the oxidatively drying inks described herein may further comprise one or more solvents and/or diluents.

The oxidatively drying inks described herein may further comprise additives that include, but are not limited to, one or more of the following components as well as combinations of these: anti-settling agents, anti-foaming agents, surfactants and other processing aids known in the field of inks. Additives described herein may be present in the oxidatively drying ink compositions disclosed herein in amounts and in forms known in the art, including in the form of so-called nano-materials where at least one of the dimensions of the particles is in the range of 1 to 1000 nm.

The present invention further provides methods for producing the oxidative drying inks described herein and oxidative drying inks obtained therefrom.

The method comprises a step of dispersing, mixing and/or milling the at least one oxidative drying varnish described herein, the one or more neutral manganese complex compounds described herein and the additives when present.

The oxidative drying inks described herein are particularly suitable to be applied by a process selected form the group consisting of offset processes, letterpress processes and intaglio printing processes onto a non-porous substrate also referred in the art as difficult substrates) selected from the group consisting of polymer materials, composite materials, metals or metalized materials and combinations thereof, more preferably polymer materials and composite materials. Typical examples of polymer materials include without limitation polypropylene (PP) such as bi-oriented polypropylene (BOPP), polyethylene (PE), polyamide, polycarbonate (PC), polyvinyl chloride (PVC), polyethylene terephthalate (PET) and mixtures thereof. Typical examples of composite materials include without limitation multilayer structures and laminates of paper-containing materials and at least one polymer material and paper-containing materials comprising synthetic fibers.

The present invention further provides uses of the one or more neutral manganese compounds described herein as oxypolymerization catalysts for the oxidative drying inks described herein for printing by an offset process, letterpress process or intaglio process on a non-porous substrate selected from the group consisting of polymer materials, composite materials, metals or metalized materials and combinations thereof.

The present invention further provides uses of the one or more neutral manganese complex compounds described herein in the oxidative drying inks described herein for decreasing the drying time of said oxidative drying inks when applied as a layer or as a coating by a process printing selected from the group consisting of offset processes, letterpress processes and intaglio printing processes on a non-porous substrate preferably selected from the group consisting of polymer materials, polymers, composite materials, metals or metalized materials.

Also described herein are methods for decreasing the drying time of oxidative drying inks when applied by a process printing selected from the group consisting of offset processes, letterpress processes and intaglio printing processes on a non-porous substrate selected from the group consisting of polymer materials, composite materials, metals or metalized materials and combinations thereof, said method comprising a step of adding the one or more neutral manganese complex compounds in the oxidative drying ink described herein.

Also described herein are security elements comprising the non-porous substrate selected from the group consisting of polymer materials, composite materials, metals or metalized materials and combinations thereof described herein and a layer or coating made of the oxidative drying ink described herein.

Also described herein are security elements comprising a layer or coating made of the oxidative drying ink described herein and a non porous substrate selected from the group consisting of polymer materials, composite materials, metals or metalized materials and combinations thereof in the form of a transfer foil which can be applied to a document or to an article in a separate transfer step. To this aim, the non-porous substrate is provided with a release coating, on which the oxidative drying ink is printed as hereinbefore described. Such security elements are known in the art and need not be discussed in detail here.

Also described herein are security documents comprising the non-porous substrate selected from the group consisting of polymer materials, composite materials, metals or metalized materials and combinations thereof described herein and a layer or coating made of the oxidative drying ink described herein or security documents comprising one or more of the security elements described herein. Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents, right-conferring documents, driving licenses, credit cards, access cards, transportation titles, vouchers and secured product labels. Alternatively, the security element described herein may be produced onto an auxiliary substrate such as for example a security thread, security stripe, a foil, a decal, a window or a label and consequently transferred to a security document in a separate step.

With the aim of further increasing the security level and the resistance against counterfeiting and illegal reproduction of security documents, the non-porous substrate described herein may contain watermarks, security threads, fibers, planchettes, luminescent compounds, windows, foils, decals, coatings, primers and combinations thereof.

With the aim of increasing the durability through soiling or chemical resistance and cleanliness and thus the circulation lifetime of security documents or with the aim of modifying their aesthetical appearance (e.g. optical gloss), one or more protective layers may be applied on top of the security element or security document described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable. More preferably UV-Vis curable compositions.

Offset printing is a method consisting of transferring an ink from a printing plate to a blanket and then applying the ink on an article or a substrate. In a conventional offset printing process, the printing plate is damped, usually with a water or fountain solution, before it is inked. In such a conventional process, water forms a film on the hydrophilic areas (i.e. the non-image areas) of the printing plate but contracts into tiny droplets on the water-repellent areas (i.e. the image areas). When an inked roller is passed over the damped printing plate, it is unable to ink the areas covered by the water film but it pushes aside the droplets on the water-repellant areas and these ink up. Dry offset printing, also referred in the art as offset letterpress or letterset printings, combines features of both letterpress and lithographic printing. In such a process, the image is raised—as in letterpress—but is offset on to a rubber blanket before printing onto the substrate.

Particularly preferred oxidative drying inks for printing by offset printing comprise the following components in the following amounts:

| Ingredients | weight-% |
|---|---|
| the at least one oxidative drying varnish described herein | 10 to 90, preferably 25 to 90 |
| the one or more neutral manganese complex compounds described herein | 0.001 to 10, preferably 0.1 to 5 |
| the one or more antioxidants described herein | 0.05 to 3, preferably 0.1 to 1 |
| the inorganic pigments, organic pigments or mixtures thereof described herein | 0 to 45, preferably 0.1 to 40 |
| the one or more waxes described herein | 0.5 to 5, preferably 1 to 4 |
| the one or more fillers and/or extenders described herein | 0 to 30, preferably 1 to 20 | the weight percents being based on the total weight of the oxidative drying inks, the sum of the weight percents being 100%.

Letterpress printing, also referred to as letterpress relief printing, is a method consisting of transferring an ink from a hard metal printing plate comprising raised elements, such as letters, numbers, symbols, lines or dots. The raised printing elements are coated with a layer of ink of constant thickness by the application of rollers. The ink is then transferred to an article or a substrate. The letterpress printing technique is used with printing systems such as book printing, flexographic printing and letterset.

Particularly preferred oxidative drying inks for printing by letterpress printing comprise the following components in the following amounts:

| Ingredients | weight-% |
|---|---|
| the at least one oxidative drying varnish described herein | 10 to 90, preferably 25 to 90 |
| the one or more neutral manganese complex compounds described herein | 0.001 to 10, preferably 0.1 to 5 |
| the one or more antioxidants described herein | 0.05 to 3, preferably 0.5 to 2 |
| the inorganic pigments, organic pigments or mixtures thereof described herein | 0 to 45, preferably 0.1 to 40 |
| the one or more waxes described herein | 0 to 5, preferably 0.5 to 4 |
| the one or more fillers and/or extenders described herein | 0 to 35, preferably 1 to 30 | the weight percents being based on the total weight of the oxidative drying inks, the sum of the weight percents being 100%.

Intaglio printing refers to a printing method used in particular in the field of printing security documents. In the intaglio printing process, a rotating engraved steel cylinder carrying a plate engraved with a pattern or image to be printed is supplied with ink by one or by a plurality of selective inking cylinder(s) (or chablon cylinders), each selective inking cylinder being inked in at least one corresponding colour to form multi-shade visible features. Furthermore, the intaglio printing process involves a wiping off of any ink excess present on the surface of the intaglio printing device. The wiping off process is carried out using a paper or a tissue wiping system ("calico"), or a polymeric roll wiping system ("wiping cylinder"). Subsequently, the plate is brought into contact with a substrate, e.g. with a paper, a composite or a polymer material in sheet form or web form, and the ink is transferred under pressure from the engravings of the intaglio printing device onto the substrate to be printed forming a thick printing pattern on the substrate. Intaglio printing delivers the most consistent and high quality printing of fine lines. It is the printing technology to be chosen for generating fine designs in the field of security documents, in particular banknotes and stamps.

Particularly preferred oxidative drying inks for printing by intaglio printing comprise the following components in the following amounts:

| Ingredients | weight-% |
| --- | --- |
| the at least one oxidative drying varnish described herein | 10 to 90, preferably 15 to 80, |
| the one or more neutral manganese complex compounds described herein | 0.001 to 10, preferably 0.1 to 5 |
| the inorganic pigments, organic pigments or mixtures thereof described herein | 0 to 45, preferably 0.1 to 40 |
| the one or more waxes described herein | 0.5 to 15, preferably 2 to 10 |
| the one or more fillers and/or extenders described herein | 0 to 40, preferably 10 to 40 | the weight percents being based on the total weight of the oxidative drying inks, the sum of the weight percents being 100%.

EXAMPLES

The present invention is now described in more detail with reference to non-limiting examples. The Examples below provide greater detail for the use of the drier of formula (II) as compared to reference driers in different offset oxidative drying ink compositions.

Synthesis of Ionic Manganese Complexes D6 and D7 (Comparative Examples)

The ionic manganese complexes D6 and D7 are described in WO 2011/098587 A1, P. 23-24, and have the following structures:

D6 [(MeTACN)$_2$Mn$_2$(O$_3$)]$^{2+}$(PF$_6^-$)$_2$ complex):

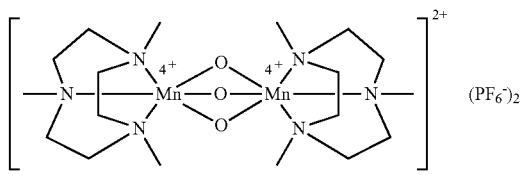

D7 [(MeTACN)$_2$Mn$_2$(O)((OOCC$_6$H$_5$)$_2$]$^{2+}$(PF$_6^-$)$_2$ complex):

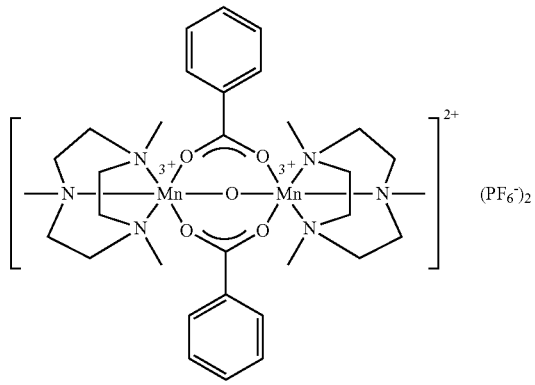

The tridentate ligand N,N',N''-trimethyl-1,4,7-triazacyclononane (MeTACN) was obtained from ABCR GmbH & Co KG, Karlsruhe, Germany. All other products were obtained from Fluka, Buchs, Switzerland.

The synthesis of D6 was carried out as disclosed in WO 2011/098583 A1, page 22, l. 31, to p. 23, line 2, analogous to the references K. Wieghardt et al., JACS, (1988), 110, 7398-7411, and J. Chem. Soc. Chem Commun., (1985), 347-349: A solution of N,N',N''-trimethyl-1,4,7-triazacyclononane (8.6 g, 49.9 mmol) in a 85:15 mixture EtOH/H$_2$O (260 ml) under an argon atmosphere was treated with manganese acetate Mn(CH$_3$COO)$_3$ 2 H$_2$O (7.74 g, 28.9 mmol) and sodium acetate (17.2 g, 151 mmol). A clear deep-red solution was obtained. The pH of the solution was adjusted to pH=5 by adding concentrated perchloric acid HClO$_4$ and sodium perchlorate NaClO$_4$ (25.8 g). Deep-red crystals precipitated yielding 8.0 g of [(N,N',N''-trimethyl-1,4,7-triazacyclononane)$_2$Mn$^{III}_2$(μ-O)(μ-CH$_3$CO$_2$)$_2$](ClO$_4$)$_2$ (58%).

Subsequently, triethylamine (48 ml) was added to a solution of [(N,N',N''-trimethyl-1,4,7-triazacyclononane)$_2$Mn$^{III}_2$(μ-O)(μ-CH$_3$CO$_2$)$_2$](ClO$_4$)$_2$ (8 g, 9.95 mmol) dissolved in a 1:1 mixture of EtOH/H$_2$O (480 ml). NaPF$_6$ (32 g, 55 mmol) was added. The precipitated manganese dioxide MnO$_2$ was removed by filtration. The manganese complex D6 crystallized as large red crystals. Recrystalization from a 1:9 mixture of MeCN/EtOH yielded 3.63 g of red crystals (45%). Microanalysis (double measurement) C$_{18}$H$_{42}$N$_6$O$_3$Mn$_2$F$_{12}$P$_2$ (calculated: C %:27.35; H %:5.36, N %:10.63): C %:27.13 and 27.16; H %:5.27 and 5.29, N %:10.52 and 10.56. The product structure of D6 was confirmed by X-Ray crystal structure analysis.

The preparation of D7 (disclosed in WO 2011/098583 A1, page 23, as manganese carboxylate complex A), was carried out as described in WO 2011/098583 A1, page 23, l. 10-16:

A solution of L-ascorbic acid (0.37 g, 2.1 mmol) in 40 ml of H$_2$O was added to a solution of the manganese complex D6 (1.6 g, 2.02 mmol) and benzoic acid (0.47 g, 3.84 mmol) in 400 ml of H$_2$O under rapid stirring. The manganese complex D7 precipitated as deep-purple crystals (0.90 g, 45%).

ESI-MS: (C$_{32}$H$_{52}$N$_6$O$_6$Mn$_2$)$^{2+}$(M=710.27601; m/z=355.1377 (for z=2). Microanalysis (double measurement) C$_{32}$H$_{52}$N$_6$O$_5$Mn$_2$ F$_{12}$P$_2$ (calculated: C %:38.41; H %:5.24, N %:8.40): C %:37.71 and 37.77; H %:4.78 and 4.89, N %:8.14 and 8.19. The product structure of D7 was confirmed by X-Ray crystal structure analysis.

Preparation of Offset Oxidative Drying Ink Compositions.

The oxidative drying ink compositions were prepared by mixing at room temperature the ingredients listed in Table 1.

The resulting paste was ground on a SDY300 three roll mill in 3 passes (a first pass at a pressure of 6 bars, a second and a third pass at a pressure of 12 bars).

The driers were added (in an amount listed in Tables 3-5) to the paste obtained as described herebefore and about 10 g of said so-obtained compositions were mixed in a Speed-Mixer™ (DAC 150 SP CM31 from Hauschild Engineering) at a speed of 2500 rpm for 3 minutes at room temperature. Viscosity of the offset oxidative drying ink compositions was measured on a Haake Roto Visco 1 rotational rheometer (40° C. and 1000 s$^1$) as given in Table 1.

Printing Method

The offset oxidative drying ink compositions were printed with a Multipurpose Printability Tester from Prüfbau on the substrates indicated in Tables 3-5. The offset oxidative drying ink composition amount was 1 g/m$^2$ or 4 g/m$^2$ as indicated in Tables 3-5.

Drying Time Measurement Method

About one hour after having printed the offset oxidative drying ink compositions on the substrates, test specimens (rectangle of 2 cm×3 cm) were cut. The rectangle was covered with a blank rectangle of the same substrate. The combined rectangles were passed through an Intaglio Proof Press ORMAG at 80° C. under a pressure of 3.4 bars. The rectangles were separated and any ink composition transfer was checked on the blank substrate rectangle. The process was repeated every hour until no ink composition transfer was visible on the blank polymer substrate rectangle. Laboratory conditions were 20-22° C. and 50-60% relative humidity.

Stability Measurement Method

The stability of the offset oxidative drying ink compositions was assessed by a thick layer coated on a glass plate, the stability period referring to the time during which the offset oxidative drying ink compositions stay on the glass plate without observing skin formation.

Two 55 micrometers thick adhesive tapes were placed on the two edges of a glass plate. An offset oxidative drying ink composition sample was coated with a spatula on the glass plate between the two adhesives tapes. The adhesive tapes were removed.

The glass plate with the offset oxidative drying ink composition was placed on a Drying Recorder BK10 or BK3 from Mickle Lab Engineering. The time was recorded until the ink coating was completely dried, i.e. until the needle of the Drying Recorder does not leave any mark in the coated sample, corresponding to a stage (IV, Dry-Through Time) according to the norm ASTM 5895. The time was recorded as the stability time of the ink composition. Laboratory conditions: were 20-22° C. and 50-60% relative humidity.

ΔE Measurement Method According to CIELAB (1976)

The color difference between an offset oxidative drying ink composition comprising the drier D# and the offset oxidative drying ink compositions comprising the drier D2 at 3.7 wt-% (Comparative Example C2) was measured and expressed as ΔE CIELAB (1976). The ΔE values were measured with a spectrophotometer SF 300 from Datacolor. Measurements were performed with a dual-beam spectrophotometer with geometry diffuse illuminator/detection at 8° (sphere diameter: 66 mm; BaSO4 coated, light source: pulsed Xenon, filtered to approximate D65 (standard Observer 10°))

ΔE were measured using the sample of the Comparative Example C2 as the reference compound according to the following:

$$\Delta E = [(\Delta L^*)^2 + (\Delta a^*)^2 + (\Delta b^*)^2]^{1/2} = [(L^*_{(Sample\ \#)} - L^*_{(C2)})^2 + (a^*_{(Sample\ \#)} - a^*_{(C2)})^2 + (b^*_{(Sample\ \#)} - b^*_{(C2)})^2]^{1/2}, \text{ wherein}$$

ΔL* is the lightness difference
Δa* is the red-green difference
Δb* is the blue/yellow difference Larger ΔE indicates stronger deviation from the color of the sample used as standard (C2, sample comprising D2 at a metal concentration of 0.35 wt-%).

Bronzing Measurement Method

The bronzing values were measured with a spectrophotometer WICO10 5&5 from Phyma.

The dried offset oxidative drying ink compositions were illuminated with a D65 light source (CIE 10° Standard Observer) at 45° (from substrate surface normal). Measurement of hue value "h" were performed at 0° (from substrate surface normal) and at −22.5° (from substrate surface normal). The difference |Δh| was calculated with the following:

$$|\Delta h| = h_{(0°)} - h_{(-22.5°)}.$$

Larger |Δh| indicates a larger color difference at the two observation angles, i.e. a stronger bronzing effect.

Yellowing

The yellowing of layers made of the offset oxidative drying ink compositions is expressed as Δb* CIELAB (1976). The b* values were measured with a spectrophotometer Microflash® MF45 from Datacolor. The offset oxidative drying ink compositions were illuminated with a D65 light source (10° Standard Observer). Ab* were calculated according to the following:

$$\Delta b^* = [b^*_{after\ 7\ days\ in\ oven\ at\ 60°\ C.} - b^*_{after\ 1\ day\ in\ oven\ at\ 60°\ C.}]$$

$$\Delta b^* = [b^*_{after\ 14\ days\ in\ oven\ at\ 60°\ C.} - b^*_{after\ 1\ day\ in\ oven\ at\ 60°\ C.}]$$

TABLE 1

Offset oxidative drying ink compositions

| Ingredients | Composition I1 wt-% | Composition I2 wt-% | Composition I3 wt-% |
|---|---|---|---|
| Varnish I Alkyd resin (Uralac AD 85) | 30 | 30 | 30 |
| Varnish II (40 parts phenolic/ alkyphenolic resins cooked in 40 parts tung oil and dissolved in 20 mineral oil (PKWF 6/9 af)) | 40.73 | 40.73 | 57.73 |
| Pigment (C.I. Pigment Violet 23) | 25 | — | — |
| Pigment white (TiO$_2$) | — | 25 | — |
| Fumed silica | — | — | 8 |
| Wax (PE wax) | 4 | 4 | 4 |
| Antioxidant (tert-butyl hydroquinone) | 0.27 | 0.27 | 0.27 |
| Viscosity (Pa · s) | 8.5 | 4.1 | 7.1 |

The wt-% are based on the total weight of the offset oxidative drying ink compositions.

TABLE 2

Oxidative catalysts (Driers)

| oxidative catalyst | Metal | Drier components | Concentration of the drier's components in the drier [wt-%] | Concentration of the metal(s) in the drier [wt-%][a] |
|---|---|---|---|---|
| D1 Nuodex DryCoat | $Mn^{2+}$ + $Mn^+$ | Mixture of structures (II) CAS [1381939-25-82] | <10 | 1 |
| | | Ethyl hexanol CAS [104-76-7] | <5 | |
| | | Dearomatised Kerosene CAS [64742-48-9] | 70-90 | |
| D2 | $Co^{2+}$ $Mn^{2+}$ | Co-octoate CAS [136-52-7] | 20-50 | 4.7 |
| | | Mn-octoate CAS [13434-24-7] | 20-50 | 4.7 |
| | | C12-C18-hydrocarbons CAS [93924-45-9] | 20-50 | |
| | | Fatty acid CAS [61789-52-4] | 1-5 | |
| D3 Borchers dry 0411 HS | $Mn^{2+}$ | Manganese neodecanoate CAS [27253-32-3] | 40-60 | 7 |
| | | 2,2'bipyridyl | <20 | |
| | | Fatty acid ester | 20-40 | |
| D4 Shepherd Mirecourt OCTMO 155E | $Mo^{2+}$ | bis(2-ethylhexanoate-O) dioxomolybdenum CAS [94232-43-6] | 62 | 15.3 |
| | | 2-ethylhexanoic acid | 38 | |
| D5 Borchers VP0132 | $V^{2+}$ | Vanadium compounds | 50-70 | 5.1 |
| | | Dibutyl hydrogen phosphate | 20-27 | |
| D6 | | $MnMeTACN^{2+}$ $(PF_6^-)_2$ | 10 | 1.39 |
| | | acetone | 90 | |
| 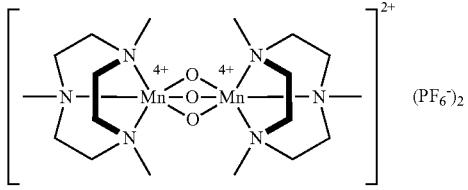 | | | | |
| D7 | | | 10 | 1.09 |
| | | acetone | 90 | |
| 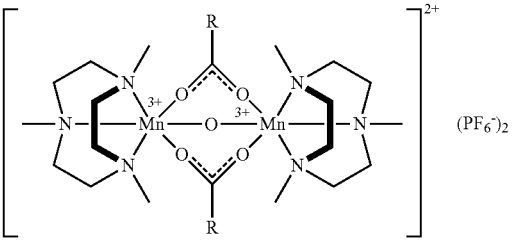 wherein R = Ph | | | | |

[a]Determined analytically by ICP-MS.

TABLE 3

Offset oxidative drying ink compositions based on I1 and comprising various driers (Examples E# and Comparative Examples C#)

| Example | Substrate | drier/ [wt-%] | metal in ink composition/ [wt-%] | Drying time [hours][b] | Stability on glass plate [hours] | ΔE/[c] | Bronzing/[c] |
|---|---|---|---|---|---|---|---|
| E1 | Guardian ® | D1/3.5 | D1/0.035 | 5 | >48 | 2.25 | −4.55 |
| C1 | Guardian ® | D2/0.37 | D2/0.035 | 40 | >48 | — | — |
| C2 | Guardian ® | D2/3.7 | D2/0.35 | 16 | >48 | Standard | −15.51 |
| C3 | Guardian ® | D3/0.5 | D3/0.035 | 40 | >48 | — | — |
| C4 | Guardian ® | D3/5.0 | D3/0.35 | 8 | 37 | 1.18 | −7.65 |
| C5 | Guardian ® | D4/0.23 | D4/0.035 | >48 | >48 | — | — |
| C6 | Guardian ® | D4/2.3 | D4/0.35 | >48 | >48 | 7.17 | −27.73 |

TABLE 3-continued

Offset oxidative drying ink compositions based on I1 and comprising various driers (Examples E# and Comparative Examples C#)

| Example | Substrate | drier/ [wt-%] | metal in ink composition/ [wt-%] | Drying time [hours]$^b$ | Stability on glass plate [hours] | $\Delta E/^c$ | Bronzing/$^c$ |
|---|---|---|---|---|---|---|---|
| C7 | Guardian ® | D5/0.7 | D5/0.035 | >48 | >48 | — | — |
| C8 | Guardian ® | D5/7.0 | D5/0.35 | 20 | 48 | 5.27 | −34.15 |
| C9 | Guardian ® | D6/2.5 | D6/0.035 | 16 | 46 | 11.99 | 16.96 |
| C10 | Guardian ® | D7/3.2 | D7/0.035 | >48 | 48 | 10.90 | 109.71 |

$^b$1 g/m$^2$
$^c$4 g/m$^2$
Guardian ® is a commercial product from Securency.

As shown in Table 3, the offset oxidative drying ink composition according to the present invention (E1) exhibited reduced drying time in comparison with offset oxidative drying ink compositions comprising as drier components cobalt octoate and manganese octoate (C1-C2), manganese neodecanoate and 2,2'bipyridyl (C3-C4), bis(2-ethylhexanoate-O) dioxomolybdenum (C5-C6), vanadium compounds (C7-C8) or manganese compounds (C9-C10). For offset oxidative drying ink compositions comprising a same amount of metal (0.035 wt-%), the offset oxidative drying ink composition according to the present invention (E1) exhibited an at least 3-fold decrease of drying time.

In addition to the strongly reduced drying time, the offset oxidative drying ink composition according to the present invention (E1) further exhibited an improved bronzing behavior.

TABLE 4

Offset oxidative drying ink compositions based on I1, comprising different driers and printed on different substrates

| | | Metal in ink | drying time [hours]$^b$ with substrate: | | | | |
|---|---|---|---|---|---|---|---|
| | Drier [wt-%] | composition [wt-%] | Guardian ® | WinTHRU ® | Hybrid ™ | Luxor ®/ Alufin ® | Diamone ® |
| E2 | D1/3.5 | D1/0.035 | 5 | 24 | 4 | 16 | 4 |
| C11 | D2/0.37 | D2/0.035 | 40 | 48 | 24 | 40 | 24 |
| C12 | D2/3.7 | D2/0.35 | 16 | 24 | 8 | 16 | 8 |
| C13 | D3/0.5 | D3/0.035 | 40 | 48 | 16 | 40 | 20 |
| C14 | D4/0.23 | D4/0.035 | >48 | >48 | >48 | >48 | >48 |
| C15 | D5/0.7 | D5/0.035 | >48 | >48 | >48 | >48 | >48 |
| C16 | D6/2.5 | D6/0.035 | 16 | >48 | 10 | 20 | 8 |
| C17 | D7/3.2 | D7/0.035 | >48 | >48 | 30 | >48 | 24 |

Guardian ® and WinTHRU ® are commercial products from Securency.
Hybrid ™ are commercial products from Louisenthal.
Luxor ®/Alufin ® KPW Hot Stamping is a commercial product from Leonhard Kurz Stiftung.
Diamone ® is a commercial product from Arjowiggins.

As shown in Table 4, the improved performance of the offset oxidative drying ink composition according to the present invention (E2) in terms of drying time is similar when the ink was applied to different non-porous substrates. Whereas a similar performance might be obtained with an offset oxidative drying ink composition comprising as a drier component cobalt octoate and manganese octoate (C12) on some substrates, said drier component was present in an amount 10 times higher than present in the composition according to the present invention (0.35 wt-% instead of 0.035 wt-%).

TABLE 5A-1

Offset oxidative drying ink compositions based on I2 and comprising various driers (Examples E# and Comparative Examples C#)

| Example | Substrate | drier/[wt-%] | metal in ink composition/ [wt-%] | b*$_{after\ printing}$ | b*$_{after\ 1\ day\ in\ oven\ at\ 60°\ C.}/^c$ | b*$_{after\ 2\ days\ in\ oven\ at\ 60°\ C.}/^c$ |
|---|---|---|---|---|---|---|
| E3 | Guardian ® | D1/3.5 | D1/0.035 | 5.78 | 17.11 | 17.94 |
| C18 | Guardian ® | D2/0.37 | D2/0.035 | 5.05 | 12.98 | 14.15 |
| C19 | Guardian ® | D2/3.7 | D2/0.35 | 5.56 | 15.42 | 17.68 |

TABLE 5A-1-continued

Offset oxidative drying ink compositions based on I2 and comprising various driers
(Examples E# and Comparative Examples C#)

| | | | metal in ink composition | | | |
|---|---|---|---|---|---|---|
| C20 | Guardian ® | D3/0.5 | D3/0.035 | 5.64 | 13.61 | 14.58 |
| C21 | Guardian ® | D4/0.23 | D4/0.035 | 5.96 | 9.19 | 9.66 |
| C22 | Guardian ® | D5/0.7 | D5/0.035 | 5.55 | 10.55 | 11.83 |
| C23 | Guardian ® | D6/2.5 | D6/0.035 | 5.69 | 12.45 | 12.47 |
| C24 | Guardian ® | D7/3.2 | D7/0.035 | 5.64 | 8.89 | 9.14 |

| Example | $b^*_{\text{after 4 days in oven at 60° C.}}/^c$ | $b^*_{\text{after 7 days in oven at 60° C.}}/^c$ | $b^*_{\text{after 14 days in oven at 60° C.}}/^c$ |
|---|---|---|---|
| E3 | 18.99 | 19.63 | 20.39 |
| C18 | 15.51 | 16.52 | 17.57 |
| C19 | 19.11 | 20.07 | 21.27 |
| C20 | 15.47 | 16.38 | 17.25 |
| C21 | 9.94 | 10.38 | 11.23 |
| C22 | 13.23 | 14.36 | 16.09 |
| C23 | 13.89 | 14.80 | 16.00 |
| C24 | 9.29 | 9.91 | 11.00 |

| Example | $b^*_{\text{after 21 days in oven at 60° C.}}/^c$ | $b^*_{\text{after 28 days in oven at 60° C.}}/^c$ | $b^*_{\text{after 56 days in oven at 60° C.}}/^c$ |
|---|---|---|---|
| E3 | 20.63 | 20.92 | 22.53 |
| C18 | 18.08 | 18.26 | 19.72 |
| C19 | 21.88 | 21.90 | 23.35 |
| C20 | 17.18 | 18.02 | 19.52 |
| C21 | 11.98 | 12.25 | 13.69 |
| C22 | 17.08 | 17.07 | 18.73 |
| C23 | 16.23 | 16.48 | 17.68 |
| C24 | 11.11 | 11.37 | 12.92 |

$^c$ 4 g/m$^2$

TABLE 5A-2

Offset oxidative drying ink compositions based on I2 and comprising various driers
(Examples E# and Comparative Examples C#)

| Example | Substrate | drier/[wt-%] | metal in ink composition/[wt-%] | $\Delta b^*(b^*_{\text{7 days in oven}} - b^*_{\text{1 day in oven}})$ | $\Delta b^*(b^*_{\text{14 days in oven}} - b^*_{\text{1 day in oven}})$ |
|---|---|---|---|---|---|
| E3 | Guardian ® | D1/3.5 | D1/0.035 | 2.52 | 3.28 |
| C18 | Guardian ® | D2/0.37 | D2/0.035 | 3.54 | 4.59 |
| C19 | Guardian ® | D2/3.7 | D2/0.35 | 4.65 | 5.85 |
| C20 | Guardian ® | D3/0.5 | D3/0.035 | 2.77 | 3.64 |
| C21 | Guardian ® | D4/0.23 | D4/0.035 | 1.19 | 2.04 |
| C22 | Guardian ® | D5/0.7 | D5/0.035 | 3.81 | 5.54 |
| C23 | Guardian ® | D6/2.5 | D6/0.035 | 2.35 | 3.55 |
| C24 | Guardian ® | D7/3.2 | D7/0.035 | 1.02 | 2.11 |

| Example | $\Delta b^*(b^*_{\text{21 days in oven}} - b^*_{\text{1 day in oven}})$ | $\Delta b^*(b^*_{\text{28 days in oven}} - b^*_{\text{1 day in oven}})$ | $\Delta b^*(b^*_{\text{56 days in oven}} - b^*_{\text{1 day in oven}})$ |
|---|---|---|---|
| E3 | 3.52 | 3.81 | 5.42 |
| C18 | 5.10 | 5.28 | 6.74 |
| C19 | 6.46 | 6.48 | 7.93 |
| C20 | 3.57 | 4.41 | 5.91 |
| C21 | 2.79 | 3.06 | 4.50 |
| C22 | 6.53 | 6.52 | 8.18 |
| C23 | 3.78 | 4.03 | 5.23 |
| C24 | 2.22 | 2.48 | 4.03 |

TABLE 5B-1

Offset oxidative drying ink compositions based on I3 and comprising various driers
(Examples E# and Comparative Examples C#)

| Example | Substrate | drier/[wt-%] | metal in ink composition/[wt-%] | $b^*_{\text{after printing}}$ | $b^*_{\text{after 1 day in oven at 60° C.}}/^c$ | $b^*_{\text{after 2 days in oven at 60° C.}}/^c$ |
|---|---|---|---|---|---|---|
| E4 | Guardian ® | D1/3.5 | D1/0.035 | 7.25 | 20.05 | 21.21 |
| C25 | Guardian ® | D2/0.37 | D2/0.035 | 7.06 | 16.75 | 18.95 |
| C26 | Guardian ® | D2/3.7 | D2/0.35 | 7.16 | 22.09 | 23.25 |
| C27 | Guardian ® | D3/0.5 | D3/0.035 | 7.22 | 17.2 | 18.62 |

TABLE 5B-1-continued

Offset oxidative drying ink compositions based on I3 and comprising various driers
(Examples E# and Comparative Examples C#)

| | | | | | | |
|---|---|---|---|---|---|---|
| C28 | Guardian ® | D4/0.23 | D4/0.035 | 7.68 | 12.13 | 13.14 |
| C29 | Guardian ® | D5/0.7 | D5/0.035 | 7.21 | 14.45 | 14.45 |
| C30 | Guardian ® | D6/2.5 | D6/0.035 | 7.02 | 17.98 | 19.50 |
| C31 | Guardian ® | D7/3.2 | D7/0.035 | 6.73 | 13.20 | 14.07 |

| Example | $b^*_{\text{after 4 days in oven at 60° C.}}/^c$ | $b^*_{\text{after 7 days in oven at 60° C.}}/^c$ | $b^*_{\text{after 14 days in oven at 60° C.}}/^c$ |
|---|---|---|---|
| E4  | 22.23 | 23.04 | 24.30 |
| C25 | 20.17 | 22.18 | 23.38 |
| C26 | 23.78 | 26.26 | 27.71 |
| C27 | 19.87 | 21.13 | 22.02 |
| C28 | 14.03 | 15.12 | 16.25 |
| C29 | 16.67 | 17.59 | 18.85 |
| C30 | 19.43 | 21.28 | 22.82 |
| C31 | 14.74 | 16.82 | 17.83 |

| Example | $b^*_{\text{after 21 days in oven at 60° C.}}/^c$ | $b^*_{\text{after 28 days in oven at 60° C.}}/^c$ | $b^*_{\text{after 56 days in oven at 60° C.}}/^c$ |
|---|---|---|---|
| E4  | 25.13 | 25.59 | 26.54 |
| C25 | 24.63 | 24.17 | 26.31 |
| C26 | 28.65 | 28.93 | 30.60 |
| C27 | 23.75 | 23.86 | 25.33 |
| C28 | 17.62 | 17.93 | 20.20 |
| C29 | 19.83 | 20.58 | 22.57 |
| C30 | 23.68 | 24.10 | 24.82 |
| C31 | 17.93 | 18.57 | 20.60 |

$^c$4 g/m$^2$

TABLE 5B-2

Offset oxidative drying ink compositions based on I3 and comprising various driers
(Examples E# and Comparative Examples C#)

| Example | Substrate | drier/ [wt-%] | metal in ink composition/ [wt-%] | $\Delta b^*(b^*_{\text{7 days in oven}} - b^*_{\text{1 day in oven}})$ | $\Delta b^*(b^*_{\text{14 days in oven}} - b^*_{\text{1 day in oven}})$ |
|---|---|---|---|---|---|
| E4  | Guardian ® | D1/3.5  | D1/0.035 | 2.99 | 4.25 |
| C25 | Guardian ® | D2/0.37 | D2/0.035 | 5.43 | 6.63 |
| C26 | Guardian ® | D2/3.7  | D2/0.35  | 4.17 | 5.62 |
| C27 | Guardian ® | D3/0.5  | D3/0.035 | 3.93 | 4.82 |
| C28 | Guardian ® | D4/0.23 | D4/0.035 | 2.99 | 4.12 |
| C29 | Guardian ® | D5/0.7  | D5/0.035 | 3.14 | 4.40 |
| C30 | Guardian ® | D6/2.5  | D6/0.035 | 3.30 | 4.84 |
| C31 | Guardian ® | D7/3.2  | D7/0.035 | 3.62 | 4.63 |

| Example | $\Delta b^*(b^*_{\text{21 days in oven}} - b^*_{\text{1 day in oven}})$ | $\Delta b^*(b^*_{\text{28 days in oven}} - b^*_{\text{1 day in oven}})$ | $\Delta b^*(b^*_{\text{56 days in oven}} - b^*_{\text{1 day in oven}})$ |
|---|---|---|---|
| E4  | 5.08 | 5.54 | 6.49 |
| C25 | 7.88 | 7.42 | 9.56 |
| C26 | 6.56 | 6.84 | 8.51 |
| C27 | 6.55 | 6.66 | 8.13 |
| C28 | 5.49 | 5.80 | 8.07 |
| C29 | 5.38 | 6.13 | 8.12 |
| C30 | 5.70 | 6.12 | 6.84 |
| C31 | 4.73 | 5.37 | 7.40 |

As shown in Tables 5A-1/2 and 5B-1/2, the offset oxidative drying ink compositions according to the present invention (E3-4) exhibited similar or improved non-yellowing characteristics upon ageing in comparison with other ink compositions. Whereas, the offset oxidative drying ink compositions comprising as drier component bis(2-ethylhexanoate-O) dioxomolybdenum (D4, C21 and C28) exhibited similar or better non-yellowing characteristics upon ageing in comparison with the offset oxidative drying ink compositions according to the present invention (E3 and E4), the fresh ink composition (C21 and C28) had an intrinsic brownish shade due to the complex of molybdenum and this shade remained during ageing.

As shown in Tables 3 to 5, the use of neutral manganese complex compounds of structure (II) in oxidative drying inks surprisingly led to a strong decrease of drying time when the ink is applied to a non-porous substrate while being an environmentally friendly solution compared to other driers that are commonly used in the field and while maintaining good non-yellowing characteristics and behavior upon ageing.

Moreover, the use of neutral manganese complex compounds of structure (II) in oxidative drying inks comprising colored pigments led not only to the advantages described hereabove but also to a surprisingly improved bronzing performance.

The invention claimed is:

1. An oxidative drying ink for printing by an offset process, letterpress process or intaglio process on a non-porous substrate selected from the group consisting of polymer materials, composite materials, metals or metalized materials and combinations thereof, said oxidative drying ink comprising
    at least one oxidative drying varnish and
    one or more neutral manganese complex compounds having the formula (I)

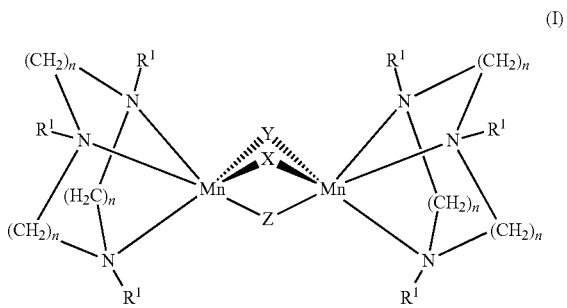

wherein
    $R_1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
    n is an integer in a range between 1 and 5;
    X, Y and Z are identical or different from each other $R_2COO^-$;
    $R_2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls.

2. The oxidative drying ink according to claim 1, wherein the one or more neutral manganese complex compounds are compounds or mixtures of compounds of structure (II)

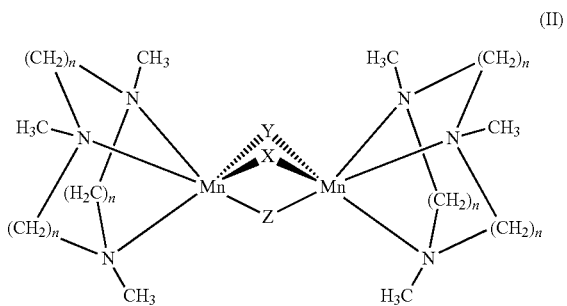

wherein
    X, Y and Z are identical or different from each other and selected from the group consisting of $CH_3$—$COO^-$ or $CH_3$—$(CH_2)_3$—$CH(CH_3CH_2)COO^-$, and
    n is an integer in a range between 1 and 4.

3. The oxidative drying ink according to claim 1, further comprising a) one or more dyes, preferably in an amount from about 1 to about 20 wt-%, and/or b) inorganic pigments, organic pigments or mixtures thereof, preferably in an amount from about 0.1 to about 45 wt-%, the weight percents being based on the total weight of the oxidatively drying ink.

4. The oxidative drying ink according to claim 1, wherein the oxidative drying ink further comprise optically variable pigments or a mixture of different optically variable pigments, preferably selected from the group consisting of selected from the group consisting of thin film interference pigments, magnetic thin film interference pigments, interference coated pigments, cholesteric liquid crystal pigments and mixtures thereof.

5. The oxidative drying ink according to claim 1, further comprising one or more antioxidants, preferably in an amount from about 0.05 to about 3 wt-%, the weight percents being based on the total weight of the oxidatively drying ink.

6. The oxidative drying ink according to claim 1, further comprising one or more fillers or extenders, preferably in an amount from about 0.1 to about 40 wt-%, the weight percents being based on the total weight of the oxidatively drying ink.

7. The oxidative drying ink according to claim 1, further comprising one or more waxes, preferably in an amount from about 0.1 to about 15 wt-%, the weight percents being based on the total weight of the oxidatively drying ink.

8. The oxidative drying ink according to claim 1, wherein the oxidative drying ink further comprises one or machine readable materials selected from the group consisting of magnetic materials, luminescent materials, electrically conductive materials, infrared-absorbing materials and combinations or mixtures thereof.

9. A method for producing the oxidative drying ink recited in claim 1, comprising a step of dispersing, mixing and/or milling the oxidative drying varnish with the one or more neutral manganese complex compounds.

10. A security element comprising a non-porous substrate selected from the group consisting of polymer materials, composite materials, metals or metalized materials and combinations thereof and a layer or coating made of the oxidative drying ink recited in claim 1.

11. A security document comprising a non-porous substrate selected from the group consisting of polymer materials, composite materials, metals or metalized materials and combinations thereof and a layer or coating made of the oxidative drying ink recited in claim 1.

12. A method for producing a security element, comprising of applying by a printing process selected from the group consisting of offset, letterpress, and intaglio, the oxidative drying ink recited in claim 1 onto a non-porous substrate selected from the group consisting of polymer materials, composite materials, metals or metalized materials and combinations thereof.

13. The method according to claim 12, further comprising drying the oxidative drying ink in the presence of air so as to form a layer or coating on the non-porous substrate selected from the group consisting of polymer materials, composite materials, metals or metalized materials and combinations thereof, said drying being performed after applying by a printing process the oxidative drying ink recited in claim 1 onto a non-porous substrate.

14. A method, comprising
    preparing the oxidative drying ink of claim 1, and
    printing the oxidative drying ink by an offset process, letterpress process or intaglio process on a non-porous substrate selected from the group consisting of polymer materials, composite materials, metals or metalized materials and combinations thereof.

15. A method, comprising
    decreasing the drying time of an oxidative drying ink applied as a layer or as a coating by a process printing selected from the group consisting of offset processes, letterpress processes and intaglio printing processes on a non-porous substrate selected from the group consisting of polymer materials, composite materials, metals or metalized materials and combinations thereof by adding one or more neutral manganese complex compounds having the formula (I)

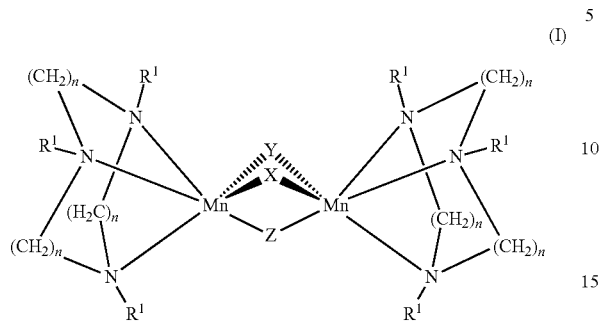

wherein
- $R_1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
- n is an integer in a range between 1 and 5;
- X, Y and Z are identical or different from each other $R_2COO^-$;
- $R_2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls to an oxidative drying ink comprising at least one oxidative drying varnish.

* * * * *